United States Patent
Ilic et al.

(10) Patent No.: US 12,380,594 B2
(45) Date of Patent: Aug. 5, 2025

(54) POSE ESTIMATION METHOD AND APPARATUS

(71) Applicant: Siemens Aktiengesellschaft, Munich (DE)

(72) Inventors: Slobodan Ilic, Munich (DE); Roman Kaskman, Munich (DE); Ivan Shugurov, Munich (DE); Sergey Zakharov, San Francisco, CA (US)

(73) Assignee: SIEMENS AKTIENGESELLSCHAFT, Munich (DE)

(*) Notice: Subject to any disclaimer, the term of this patent is extended or adjusted under 35 U.S.C. 154(b) by 472 days.

(21) Appl. No.: 17/921,784

(22) PCT Filed: Apr. 30, 2021

(86) PCT No.: PCT/EP2021/061363
§ 371 (c)(1),
(2) Date: Oct. 27, 2022

(87) PCT Pub. No.: WO2021/219835
PCT Pub. Date: Nov. 4, 2021

(65) Prior Publication Data
US 2023/0169677 A1 Jun. 1, 2023

(30) Foreign Application Priority Data
Apr. 30, 2020 (EP) .................................... 20172252

(51) Int. Cl.
*G06K 9/00* (2022.01)
*G06T 7/13* (2017.01)
*G06T 7/73* (2017.01)

(52) U.S. Cl.
CPC ............... *G06T 7/73* (2017.01); *G06T 7/13* (2017.01); *G06T 2207/20081* (2013.01); *G06T 2207/20084* (2013.01)

(58) Field of Classification Search
CPC ... G06T 7/73; G06T 7/13; G06T 2207/20081; G06T 2207/20084; G06T 2207/10016
See application file for complete search history.

(56) References Cited

U.S. PATENT DOCUMENTS

| | | | | |
|---|---|---|---|---|
| 2019/0156086 | A1* | 5/2019 | Plummer | H04N 23/45 |
| 2019/0355150 | A1* | 11/2019 | Tremblay | G06T 7/73 |
| 2020/0306980 | A1* | 10/2020 | Choi | B25J 9/1697 |

FOREIGN PATENT DOCUMENTS

| | | | | |
|---|---|---|---|---|
| CN | 110853036 | A * | 2/2020 | G06F 18/214 |
| WO | 2020 086217 | | 4/2020 | |

OTHER PUBLICATIONS

Search Report for International Application No. PCT/EP2021/061363, 13 pages, Aug. 12, 2021.
(Continued)

*Primary Examiner* — Xin Jia
(74) *Attorney, Agent, or Firm* — Slayden Grubert Beard PLLC

(57) ABSTRACT

Various embodiments of the teachings herein include a computer implemented pose estimation method for providing poses of objects of interest in a scene. The scene comprises a visual representation of the objects of interest in an environment. The method comprising: conducting for each one of the objects of interest a pose estimation; determining edge data of the object of interest from the visual representation representing the edges of the respective object of interest; determining keypoints of the respective object of interest by a previously trained artificial neural keypoint detection network, wherein the artificial neural keypoint detection network utilizes the determined edge data (Continued)

of the respective object of interest Oi as input and provides the keypoints of the respective object of interest as output; and estimating the pose of the respective object of interest based on the respective object's keypoints provided by the artificial neural keypoint detection network.

15 Claims, 6 Drawing Sheets

(56) References Cited

OTHER PUBLICATIONS

Search Report for EP Application No. 20172252.7, 10 pages, Oct. 9, 2020.
Pereira, Nuno et al:"Masked Fusion: Mask-based 6D Object Pose Detection"; Arxiv.Org; Cornell University Library; 201, Olin Library Cornell University Ithaca; NY 14853; XP081534671, Nov. 18, 2019.
Kingma, Diederik P. et al. "Adam: A Method for Stochastic Optimization" 3rd International Conference for Learning Representations (ICLR), San Diego, 2015, arXiv:1412.6980.
Birdal 2017: Birdal T, Ilic S; "A point sampling algorithm for 3d matching of irregular geometries"; IEEE/RSJ International Conference on Intelligent Robots and Systems (IROS); 6871-6878, 2017.
S. Umeyama, "Least-Squares Estimation of Transformation Parameters Between Two Point Patterns," IEEE Transactions on Pattern Analysis and Machine Intelligence, vol. 13, No. 4, Apr. 1, 1991.
Dai 2017: Dai A, Chang AX, Savva M, Halber M, Funkhouser T, Nießner M; "Scannet: Richly-annotated 3d reconstructions of indoor scenes"; Proceedings of the IEEE Conference on Computer Vision and Pattern Recognition; 5828-5839; 2017.
Drummond 2002: Drummond T, Cipolla R; "Real-Time Visual Tracking of Complex Structures"; IEEE Trans. Pattern Anal. Mach. Intell.; 24, 932-946; doi: 10.1109/TPAMI.2002.1017620.
COLMAP: Schonberger JL, Frahm JM; "Structure-from-motion re-visited"; Proceedings of the IEEE Conference on Computer Vision and Pattern Recognition; 4104-4113, 2016.
Peng, Sida et al:"PVNet: Pixel-Wise Voting Network for 6DoF Pose Estimation"; 2019 IEEE/CVF Conference on Computer Vision and Pattern Recognition (CVPR); IEEE, Jun. 15, 2019.
Hofer 2017: Hofer M, Maurer M, Bischof H; "Efficient 3D scene abstraction using line segments"; Computer Vision and Image Understanding; 157, 167-178.
Qi et al., "PointNet++: Deep Hierarchical Feature Learning on Point Sets in a Metric Space," Advances in Neural Information Processing Systems 30 (NIPS 2017), 10 pgs.
Schwarz, Max et al:"RGB-D object recognition and pose estimation based on pre-trained convolutional neural network features"; 2015 IEEE International Conference on Robotics And Automation (ICRA); pp. 1329-1335; ISBN: 978-1-4799-6923-4, May 1, 2015.
"SSD: Single Shot MultiBox Detector" Wei Liu; Dragomir Anguelov; et al UNC Chapel Hill; Zoox Inc. ; Google Inc.; University of Michigan; Ann-Arbor.

\* cited by examiner

POSE ESTIMATION METHOD AND APPARATUS

CROSS-REFERENCE TO RELATED APPLICATIONS

This application is a U.S. National Stage Application of International Application No. PCT/EP2021/061363 filed Apr. 30, 2021, which designates the United States of America, and claims priority to EP Application No. 20172252.7 filed Apr. 30, 2020, the contents of which are hereby incorporated by reference in their entirety.

TECHNICAL FIELD

The present disclosure relates to computer vision. Various embodiments of the teachings herein include methods and/or apparatus for the estimation of 6D poses of objects of interest in a scene.

BACKGROUND

Object detection and pose estimation are regularly addressed issues in computer vision since they are applicable in a wide range of applications in different domains. Often, RGB images and corresponding depth data are utilized to determine poses. Current state-of-the-art utilizes deep learning methods in connection with the RGB images and depth information. Thus, artificial neural networks are often applied to estimate a pose of an object in a scene based on images of that object from different perspectives and based on a comprehensive data base. However, such approaches are often time consuming and, especially, a suitable data base with a sufficient amount of labeled training data in a comprehensive variety which allows the accurate detection of a wide range of objects is hardly available.

SUMMARY

Therefore, an approach is required which serves the need to determine poses of objects in a scene. As an example, some embodiments of the teachings herein include a computer implemented pose estimation method PEM for providing poses POSi of one or more objects of interest Oi in a scene S, wherein the scene S is a visual representation VR of at least the one or more objects of interest Oi in an environment, wherein for each one of the objects of interest Oi a pose estimation is conducted, for each respective object Oi comprising a step S2 of determination of edge data EDi of the respective object of interest Oi from the visual representation VR, representing the edges of the respective object of interest Oi, a step S3 of determination of keypoints Ki,j of the respective object of interest Oi by a previously trained artificial neural keypoint detection network KDN, wherein the artificial neural keypoint detection network KDN utilizes the determined edge data EDi of the respective object of interest Oi as input and provides the keypoints Ki,j of the respective object of interest Oi as output, and a step S4 of estimation of the pose POSi of the respective object of interest Oi based on the respective object's Oi keypoints Ki,j provided by the artificial neural keypoint detection network KDN.

In some embodiments, the training of the previously trained artificial neural keypoint detection network KDN is based on synthetic models SYNi which correspond to potential objects of interest Oi.

In some embodiments, in case poses POSi are required for more than one object of interest Oi, the pose estimation is conducted simultaneously for all objects of interest Oi.

In some embodiments, the visual representation VR of the scene S is generated by creating a sequence of images IMAn of the scene S, representing the one or more objects of interest Oi from different perspectives.

In some embodiments, a structure-from-motion approach processes the visual representation VR to provide a sparse reconstruction SR at least of the one or more objects of interest Oi for the determination of the edge data EDi.

In some embodiments, for the determination of the edge data EDi, the provided sparse reconstruction SR is further approximated with lines wherein the edge data EDi are obtained by sampling points along the lines.

In some embodiments, the training of the artificial neural keypoint detection network KDN, during which KDN-parameters which define the artificial neural keypoint detection network KDN are adjusted, is based on the creation of one or more synthetic scenes SynS, wherein for each synthetic scene SynS in a preparation step PS one or more known synthetic models SYNi of respective one or more potential objects of interest Oi are provided, the synthetic scene SynS is generated by arranging the provided synthetic models SYNi in a virtual environment, such that poses SynPOSi of the provided synthetic models SYNi are known, wherein each synthetic model SYNi is represented in the synthetic scene SynS by an edge-like representation SYNEi of the respective synthetic model SYNi, and known keypoints KSYNi,j for each one of the provided synthetic models SYNi are provided, in an adjustment step AS one or more training loops TL(m) to adjust the KDN-parameters are executed, wherein in each training loop TL(m) an edge-like representation SynSE of the generated synthetic scene SynS comprising the known edge-like representations SYNEi of the provided synthetic models SYNi is provided as input training data ITD to the artificial neural keypoint detection network KDN and the artificial neural keypoint detection network KDN is trained utilizing the provided input training data ITD and the provided known keypoints KSYNi,j, representing an aspired output of the artificial neural keypoint detection network KDN when processing the input training data ITD.

In some embodiments, for the generation of the known synthetic scene SynS, a virtual surface is generated and the provided one or more known synthetic models SYNi are randomly arranged on the virtual surface.

In some embodiments, the edge-like representations SYNEi for the corresponding one or more provided synthetic models SYNi of the generated synthetic scene SYNi are generated by a step REND of rendering the generated synthetic scene SynS to generate rendered data, preferably rendering each one of the provided synthetic models SYNi of the synthetic scene SynS, preferably sampled from a corresponding plurality of known perspectives, preferably from a virtual sphere around the generated synthetic scene SynS, a step OBT of obtaining a dense point cloud model of the generated synthetic scene SynS and preferably of each one of the provided synthetic models SYNi of the synthetic scene SynS by applying a perspective-based sampling approach on the rendered data, a step RECO of reconstructing prominent edges of the dense point cloud model to generate the respective edge-like representation SynSE of the generated synthetic scene SynS and preferably to generate the respective edge-like representation SYNEi of each one of the provided synthetic models SYNi of the synthetic scene SynS.

In some embodiments, before the step OBT of obtaining the dense point cloud model, for each known perspective, features of a respective synthetic model SYNi which are not visible in the particular perspective are removed from the respective edge-like representation SYNEi.

In some embodiments, the known object keypoints KSYNi,j of a respective synthetic model SYNi comprise at least a first keypoint KSYNi,1 and one or more further keypoints KSYNi,k with k=2, 3, . . . for the respective synthetic model SYNi, wherein the keypoints KSYNi,j are calculated such that the first keypoint KSYNi,1 corresponds to the centroid of the respective synthetic model SYNi and the one or more further keypoints KSYNi,k are obtained via a farthest-point-sampling approach, preferably regarding vertices of the respective synthetic model SYNi.

In some embodiments, for each synthetic scene SynS, the network KDN is trained simultaneously for all the provided synthetic models SYNi arranged in the respective synthetic scene SynS.

As another example, some embodiments include an apparatus (100) for providing pose information POSi of one or more objects of interest Oi in a scene S, comprising a computer (110), preferably with a memory (111) and a processor (112), configured to execute one or more of the methods described herein to estimate the poses POSi of the one or more objects of interest Oi.

In some embodiments, there is a camera system (120) for imaging the scene S comprising the one or more objects of interest Oi to generate the visual representation VR.

In some embodiments, the relative positioning of the camera system (120) and the scene S is adjustable.

BRIEF DESCRIPTION OF THE DRAWINGS

In the following, possible embodiments of the different aspects of the teachings of the present disclosure are described in more detail with reference to the enclosed figures. The objects as well as potential advantages of the present embodiments will become more apparent and readily appreciated from the following description of the example embodiments, taken in conjunction with the accompanying figure in which.

DETAILED DESCRIPTION

Figure 1:
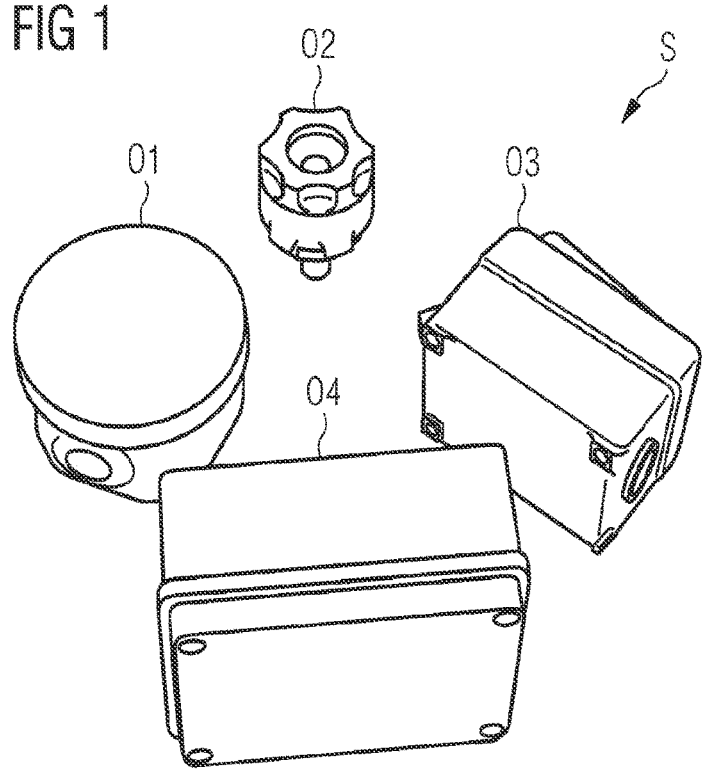
FIG. 1 shows a real world scene with objects of interest.

A computer implemented pose estimation method PEM for providing pose information of one or more objects of interest in a scene executes a pose estimation for each one of the objects of interest in the scene. The scene is a visual representation, e.g. based on one or more RGB images, of at least the one or more objects of interest in an environment and possibly one or more further objects, for which a pose information is, however, not required. I.e. the term "objects of interest" refers to those objects in the scene, for which pose information is required. Consequently, the latter objects are not covered by the term "object(s) of interest".

The pose estimation comprises for each object of interest a step of determination of edge data from the visual representation, representing the edges of the respective object of interest, a step of determination of keypoints of the respective object of interest by a previously trained artificial neural keypoint detection network KDN, wherein the artificial neural keypoint detection network KDN utilizes the determined edge data of the respective object of interest as input and provides the keypoints of the respective object of interest as output, and a step of estimation of a pose of the respective object of interest based on the respective object's keypoints provided by the artificial neural keypoint detection network KDN. The step of estimation can be based on the Umeyama algorithm, given known 3D-3D correspondences between the detected keypoints and their location on synthetic models corresponding to the respective object of interest and used in the network KDN. At this stage, the object poses in the scene coordinate system are available. I.e. knowing the correspondences between the keypoints and their correspondences on the synthetic models which are actually utilized in the training of the network KDN, the pose is determined using the Umeyama algorithm. Such synthetic models can be, for example, synthetic 3D CAD models.

Depending on the total number of objects in the scene and/or on the number of objects of interest, the pose information to be provided might only comprise the pose of one object or it might comprise the poses of multiple objects. Therein, each pose is specific for one of the objects and assigned to that respective object.

The training of the previously trained artificial neural keypoint detection network KDN is based on purely synthetic object data which correspond to potential objects of interest, i.e. any object of interest which might be appearing in a scene to be analyzed by the PEM approach. I.e. the training of the network KDN waives the use of real world data. First of all, synthetic data are simpler and cheaper to obtain than real data. Secondly, exemplarily given a CAD model, it is possible to generate infinitely many images or simulations with it, in contrast to limited sizes of manually labeled real datasets. Moreover, for 6D pose estimation, it is extremely difficult to obtain pose labels for real world objects.

In case pose information is required for more than one object of interest, the pose estimation is conducted simultaneously for all objects of interest. Training a separate network per each object is commonly done in other object detection and pose estimation pipelines since it tends to improve the results. However, such an approach is not scalable and hard to apply in practice.

The visual representation of the scene is generated by creating a sequence of images of the scene, representing the one or more objects of interest from different perspectives, i.e. different images of the sequence represent views on the scene from different perspectives. Thus, the visual representation can be considered to comprise the respective plurality of images of the sequence. Preferably but not necessarily, each image shows each one of the objects of interest. However, it might happen that an object is not visible in a particular image from a certain perspective in case that object is, for example, obstructed by another object in the scene.

For the determination of the edge data, a structure-from-motion approach processes the visual representation to provide a sparse reconstruction at least of the one or more objects of interest. In more detail, the related structure-from-motion (SfM) algorithm provides a sparse 3D point cloud reconstruction of the scene which can be utilized as the basis for further processing since, for example, it provides the geometric boundaries and features of the objects in the scene.

The provided sparse reconstruction is further approximated with lines and 3D edges, respectively, wherein the edge data are obtained by sampling points along the lines of the scene, i.e. the point cloud SfM reconstruction is approximated with an edge-like reconstruction, resulting in a more detailed reconstruction of edges in 3D. Since the scene is composed of possibly textureless objects with dominant geometric edges, places with high image gradients, that usually correspond to 3D geometric edges, will get reconstructed.

The previous training of the artificial neural keypoint detection network KDN, which results in the previously trained network KDN and during which KDN-parameters, e.g. weights etc., which define the behavior of the artificial neural keypoint detection network KDN as a response to an input are adjusted, is based on the creation of one or more synthetic object scenes. For each generated synthetic 3D scene, a preparation step and a subsequent adjustment step are executed.

In the preparation step, one or more known synthetic 3D models, e.g. CAD models, of respective one or more objects of interest are provided, i.e. the number of models corresponds to the number of objects of interest. A synthetic 3D scene is then generated by arranging the provided synthetic 3D models of the objects of interest in a virtual environment, e.g. using physics based simulation, such that poses of the provided synthetic 3D models are known. Since geometric edges are the only features robust to light changes and present in non-textured synthetic models as well as in corresponding real world objects, eventually each synthetic 3D model is represented and replaced, respectively, in the synthetic 3D scene by an edge-like representation of the respective synthetic 3D model. In this way, synthetic and real world domains have smaller discrepancy. The 3D scene and the poses of the contained known synthetic 3D models and their edges, respectively, can be assumed to be known. Moreover, in the preparation step known, pre-selected object keypoints for each one of the provided synthetic 3D models in the generated synthetic 3D scene are provided.

In summary, the basic approach to train the network on purely synthetic data provides a domain-invariant data preparation scheme.

In the adjustment step, one or more training loops TL(m) to adjust the KDN-parameters are executed. In each training loop, an edge-like representation of the generated synthetic 3D scene comprising the known edge-like representations of the provided synthetic 3D models is provided as input training data to the artificial neural keypoint detection network KDN and the artificial neural keypoint detection network KDN is trained utilizing the provided input training data, i.e. the edge-like representations, and the provided known object keypoints, the latter representing an aspired output of the artificial neural keypoint detection network KDN when processing the input training data.

Thus, the training of the network KDN is purely based on synthetic data with the remarkable advantages as mentioned above.

The generation of the synthetic 3D scene means that the synthetic 3D models are spatially arranged in a virtual environment such that their 6D poses with respect to the fixed coordinate system of the virtual environment and with respect to each other are known. Consequently, the edges and vertices of the 3D models and the respective keypoints of the models are known as well.

It might be mentioned that it is possible to first generate the 3D scene of synthetic models and subsequently generate the edge-like representations of the synthetic models in that 3D scene or execute those two steps in reversed order.

In the preparation step, for the generation of a known synthetic 3D scene by arranging the provided dense synthetic 3D models of the objects of interest in the virtual environment, a virtual surface is generated and subsequently the provided one or more known synthetic 3D models are randomly arranged and "dropped", respectively, on the virtual surface. This provides a realistic scene composed of synthetic models.

The poses of the synthetic 3D models in the scene can be considered to be known. Correspondingly, the respective keypoints of the synthetic 3D models can also be considered to be known. This enables the training of the neural network KDN.

These generated dense synthetic 3D scenes are, however, not yet ideally suitable for training, as they are not sparse. This is addressed by another processing in the preparation step, wherein the edge-like representations for the corresponding one or more provided synthetic 3D models SYNi of the generated synthetic 3D scene SYNi are generated by a step of rendering, a step of obtaining, and a step of reconstructing, finally resulting in a sparse representation of the synthetic 3D scene.

In the step of rendering, the generated synthetic 3D scene, preferably each one of the provided synthetic 3D models of the synthetic 3D scene, are rendered to generate rendered data, preferably sampled from a corresponding plurality of known views and perspectives, respectively, preferably from a virtual sphere and its upper hemisphere around the generated synthetic 3D scene.

In the step of obtaining, a dense point cloud model of the generated synthetic 3D scene and preferably of each one of the provided synthetic 3D models of the synthetic 3D scene is obtained by applying a perspective-based sampling approach on the rendered data to represent the rendered scene as 3D point cloud.

In the step of reconstructing, prominent 3D edges of the dense point cloud model are reconstructed to generate the respective edge-like representation of the generated synthetic 3D scene and preferably of each one of the provided synthetic 3D models of the synthetic 3D scene. "Prominent" 3D edges might, for example, be such edges have a gradient above a given threshold.

Thus, a sparse representation of the synthetic 3D scene is computed by using the poses of the synthetic models obtained during the physical simulation and the sparse CAD models represented with 3D edges. The obtained reconstruction is essentially a sparse representation of an originally dense model, with geometric features, namely edges, that can be observed from both captured images of the real world object as well as from its synthetic renderings and 3D models, respectively. This bridges the domain gap between the real world object and its synthetic model. The edges are corresponding to object's geometric edges which are also naturally defining the objects which do not have any texture and can also be extracted from images. Each object and its corresponding synthetic 3D model for which the 6D pose is to be estimated is represented in this way.

Furtheron, in the preparation step, in some examples before the step of obtaining the dense point cloud model, for each known perspective, features of a respective synthetic 3D model which are not visible in the particular perspective are removed from the respective edge-like representation. Such features can be, for example, 3D edges and faces of that model. With this, the dataset corresponding to the rendered synthetic 3D models is ideally suitable for training as it only contains the points of the respective synthetic 3D models which are indeed visible from the different rendering perspectives.

The known object keypoints of a respective synthetic 3D model which represent the aspired output of the artificial neural keypoint detection network KDN comprise at least a first keypoint and one or more further keypoints for the respective synthetic 3D model, wherein in the preparation step those keypoints are calculated such that the first keypoint corresponds to the centroid of the respective synthetic 3D model and the one or more further keypoints are obtained via a farthest-point-sampling approach, e.g. regarding vertices of the respective synthetic 3D model.

For each generated 3D scene, the network KDN is trained simultaneously for all the provided synthetic 3D models arranged in the respective scene as opposed to training one network per single object. Training a separate network per each object is commonly done in other object detection and pose estimation pipelines since it tends to improve the results. However, that approach is not scalable and hard to apply in practice.

The apparatus might comprise a camera system for imaging the scene comprising the one or more objects of interest to generate the visual representation from such generated images. The apparatus can be designed such that the relative positioning of the camera and the scene is adjustable. Thus, the scene can be imaged from different perspectives.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

The specification provides the following publications to achieve a detailed explanation of the invention and its execution:

Birdal2017: Birdal T, Ilic S; "A point sampling algorithm for 3d matching of irregular geometries"; IEEE/RSJ International Conference on Intelligent Robots and Systems (IROS); 6871-6878; 2017.
COLMAP: Schonberger J L, Frahm J M; "Structure-from-motion revisited"; Proceedings of the IEEE Conference on Computer Vision and Pattern Recognition; 4104-4113; 2016.
Dai2017: Dai A, Chang A X, Savva M, Halber M, Funkhouser T, Nießner M; "Scannet: Richly-annotated 3d reconstructions of indoor scenes"; Proceedings of the IEEE Conference on Computer Vision and Pattern Recognition; 5828-5839; 2017.
Drummond2002: Drummond T, Cipolla R; "Real-Time Visual Tracking of Complex Structures"; IEEE Trans. Pattern Anal. Mach. Intell.; 24, 932-946; doi:10.1109/TPAMI.2002.1017620; 2002.
Hofer2017: Hofer M, Maurer M, Bischof H; "Efficient 3D scene abstraction using line segments"; Computer Vision and Image Understanding; 157, 167-178; 2017.
Kingma2014: Kingma D P, Ba J; "Adam: A method for stochastic optimization"; arXiv preprint; arXiv: 1412.6980; 2014.
Liu2016: Liu W, Anguelov D, Erhan D, Szegedy C, Reed S, Fu C Y, Berg AC; "Ssd: Single shot multibox detector"; European conference on computer vision; 21-37, 2016.
Peng2019: Peng S, Liu Y, Huang Q, Zhou X, Bao H; "PVNet: Pixel-wise Voting Network for 6DoF Pose Estimation"; Proceedings of the IEEE Conference on Computer Vision and Pattern Recognition; 4561-4570; 2019.
Qi2017: Qi CR, Yi L, Su H, Guibas L J; "Pointnet++: Deep hierarchical feature learning on point sets in a metric space"; Advances in neural information processing systems; 5099-5108; 2017.
Umeyama1991: Umeyama S; "Least-squares estimation of transformation parameters between two point patterns"; IEEE Transactions on Pattern Analysis & Machine Intelligence; 376-380; 1991.

FIG. 1 shows an exemplary real world scene S with a plurality of objects of interest O1, O2, O3, O4 which are arranged in the scene S in various respective poses POS1-POS4. Such a pose POSi of an object Oi with i=1, 2, . . . , 4 is typically six-dimensional (6D), e.g. in the Euclidian space. Possibly, one or more further objects, for which a pose information is, however, not required, might be included in the scene S. I.e. the term "objects of interest" refers to those objects in the scene S, for which pose information is required. The scene S might comprise one or more further objects, for which pose information is not required. Consequently, the latter objects are not covered by the term "object(s) of interest".

Figure 2:
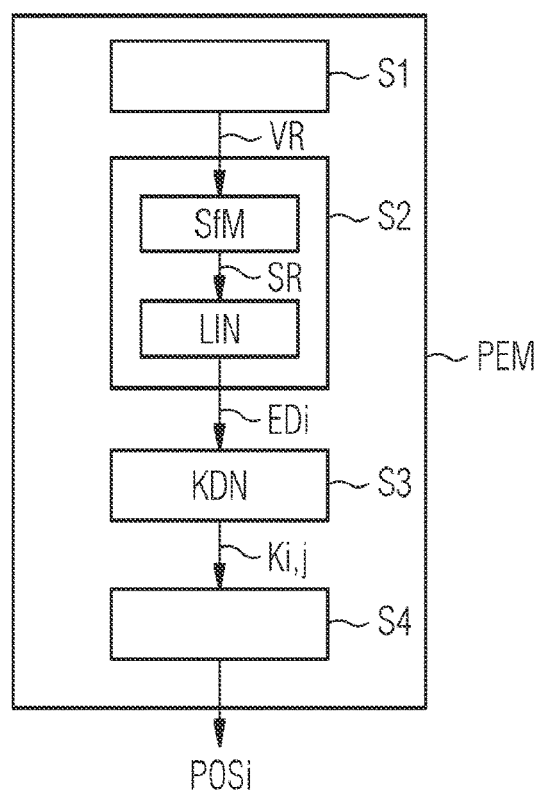
FIG. 2 shows a flow chart of a pose estimation method.

A pose estimation method PEM as visualized in FIG. 2 is applied for the aspired estimation of the 6D poses POSi of the objects of interest Oi in the scene S. In a first step S1 of the pose estimation PEM a visual representation VR of the scene S and the contained objects of interest 1-4, respectively, is generated.

The visual representation VR can be realized as a sequence SEQ of RGB images IMA1, IMA2, . . . , IMAN with N>1 such that the visual representation VR can be considered to comprise the respective plurality of images IMAn with n=1, 2, . . . , N of the sequence SEQ. For example, the images IMAn are taken with a camera wherein the corresponding sequence SEQ can be a short video sequence, i.e. a movie, or a plurality of individually taken images. In any case, different images IMAn1, IMAn2 of the sequence SEQ with n1≠n2 and n1, n2≤N are different from each other with regard to the respective perspectives on the scene S. In other words and for example, different images IMAn1, IMAn2 are taken from different directions and angles, respectively, with regard to a coordinate system fixed to the scene S such that different images IMAn1, IMAn2 of the sequence SEQ represent views on the scene S from different perspectives. In some embodiments, each one of the images IMAn shows each one of the objects Oi. However, it might happen that one or more of the objects of interest Oi is not or only in parts visible in a particular image IMAn from a certain perspective, for example in case that object Oi is—from that particular perspective—obstructed by another object in the scene S. However, it is generally required that for each object of interest Oi a plurality of views from different perspectives is available, i.e. a plurality of images IMAn showing such object Oi.

In a second step S2 of the method PEM the images IMAn of the sequence SEQ are processed such that for every object of interest Oi respective edge data EDi are obtained from the visual representation VR. The processing of the images IMAn first applies a structure-from-motion (SfM) approach which processes the visual representation VR and the images IMAn, respectively, to provide a sparse reconstruction SR of the objects of interest Oi to be further used for the determination of the edge data EDi.

In more detail, the related structure-from-motion (SfM) algorithm provides a sparse 3D point cloud reconstruction SR of the scene as well as estimated camera poses, e.g. based on the "COLMAP" algorithm. The processing of the image sequence SEQ with the COLMAP SfM method jointly estimates camera poses for each one of the images IMAn and sparse 3D points of the scene seen in the image sequence SEQ.

The resulting reconstruction SR or point cloud from SfM and COLMAP, respectively, are still sparse. An improved approximation of the geometric structures of the objects of interest Oi would be advantageous for the estimation method PEM. Therefore, the output SR of the SfM method along possibly with sequence frames are further processed in a step LIN, e.g. according to the Line3D++ method, to obtain a scene reconstruction composed of 3D edges of the objects of interest Oi. Thus, for the determination of the edge data EDi, the provided sparse reconstruction SR is further approximated in the LIN step with lines and 3D edges, respectively, wherein the edge data EDi can eventually be obtained by sampling points along the lines of the scene, e.g. using a method according to Hofer2017 like in the training phase of the network KDN as described below.

Figure 3:
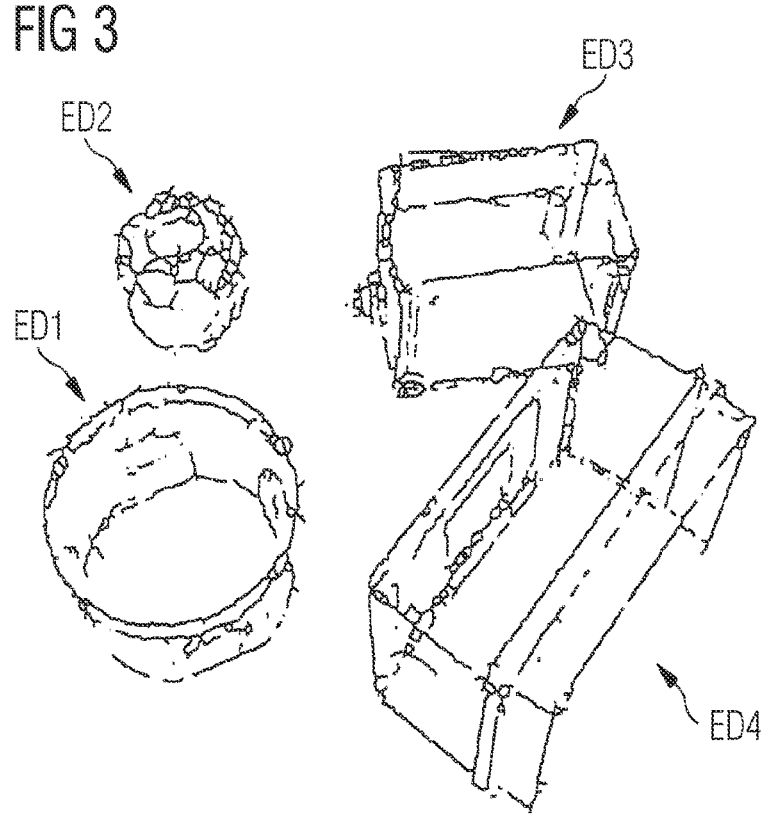
FIG. 3 shows edge data of the real world scene.

In other words, the point cloud SfM reconstruction SR is approximated in LIN with an edge-like reconstruction by fitting edge segments to the geometric discontinuities of the objects of interest Oi in the scene, resulting in a more detailed reconstruction of edges in 3D. Since the scene S is composed of possibly textureless objects Oi with dominant geometric edges, places with high image gradients, that usually correspond to 3D geometric edges, will get reconstructed. A possible result showing the edge data EDi for further processing in the pose estimation method PEM is depicted in FIG. 3. In short, in the second step S2 described above the sequence SEQ of images IMAn is fed to the SfM algorithm, e.g. COLMAP, which produces the sparse reconstruction SR of the scene S which is further approximated in the LIN step with lines, e.g. according to Hofer2017, to produce the edge data EDi of the objects of interest Oi.

Figure 4:
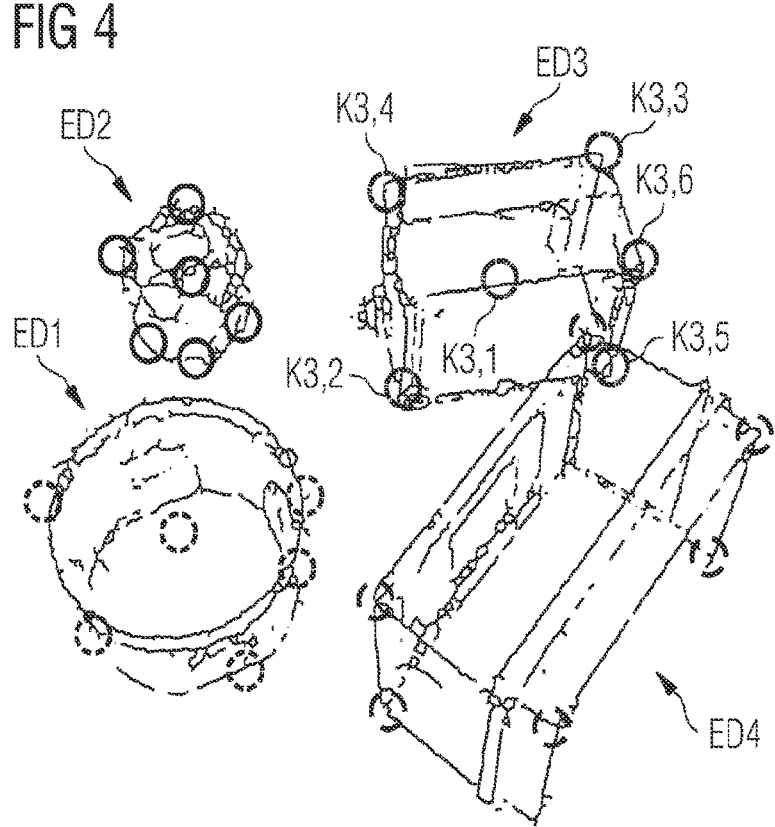
FIG. 4 shows the edge data of FIG. 3 with keypoints.

In a third step S3 of the method PEM the edge data Edi of the corresponding objects of interest Oi, i.e. essentially the sparse 3D point cloud reconstruction, are fed to a previously trained artificial neural keypoint detection network KDN to determine keypoints $K_{i,j}$ for each object of interest Oi as depicted in FIG. 4 with $j=1, \ldots, NK_i$ wherein $NK_i$ is the number of keypoints $K_{i,j}$ for a particular object Oi. For the sake of brevitry, the "artificial neural keypoint detection network KDN" will occasionally be named "network KDN" in the following. For the interest of clarity of FIG. 4, keypoints $K_{i,j}$ are marked in FIG. 4 with concrete reference signs only for the edge-like representation ED3 of the third object of interest O3. Keypoints of the other representations E1, ED2, ED4 would be marked correspondingly.

The network KDN utilizes the determined edge data EDi of the respective objects of interest Oi as input and provides the keypoints $K_{i,j}$ of the respective object of interest Oi as output. In some embodiments, the network KDN's processing and the pose estimation as such are executed simultaneously for all objects of interest Oi. The network KDN, the training of which is exclusively based on synthetic data, detects 3D keypoints $K_{i,j}$ of the objects Oi as well as their labels Li, i.e. to which object Oi the detected keypoints $K_{i,j}$ belong. Thus, the object classes C the objects Oi belong to, i.e. the identification of an object Oi, is provided by the network KDN as well.

Figure 5:
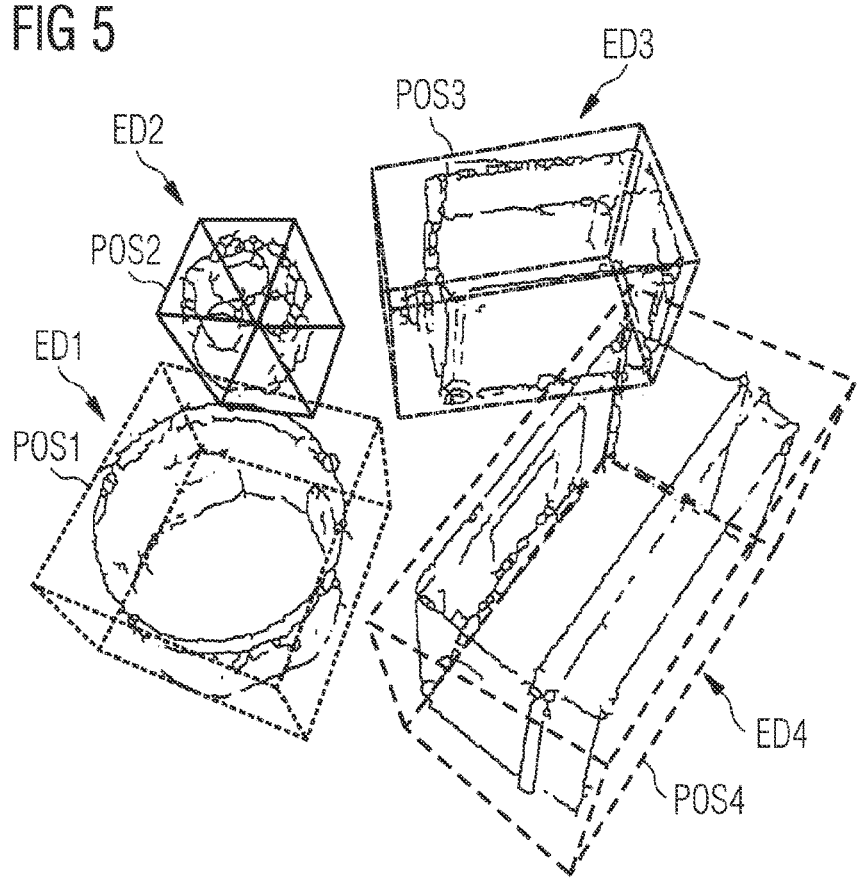
FIG. 5 shows the edge data of FIG. 3 with frames representing the poses of the objects.
Figure 6:
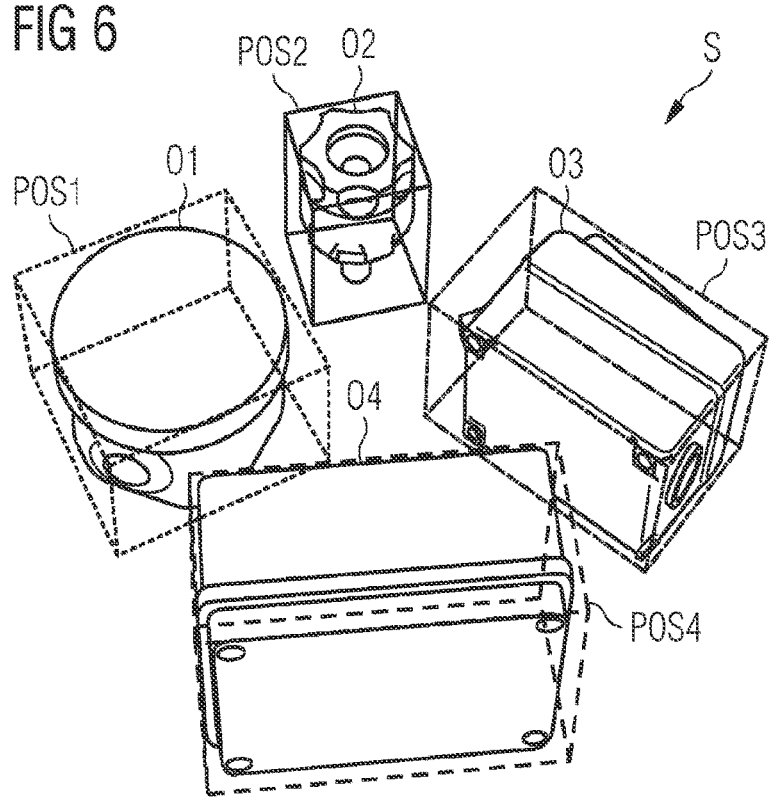
FIG. 6 shows the real world scene with the frames of FIG. 5.

In a fourth step S4 of the method PEM the keypoints $K_{i,j}$ of the objects of interest Oi are further processed to estimate the poses POSi of the objects of interest Oi. Thus, the estimation of each object's Oi pose POSi is based on the respective object's keypoints $K_{i,j}$ provided by the artificial neural keypoint detection network KDN. For example, object poses POSi can be computed in closed form with the "Umeyama" algorithm (Umeyama1991), utilizing known 3D-3D correspondences between the detected keypoints $K_{i,j}$ of an object of interest Oi and their location on the synthetic 3D model SYNi corresponding to the real world object Oi which has been used earlier to train the network KDN, as described below. I.e. at this stage, the object poses POSi in the scene S coordinate system are available. This is symbolized in FIG. 5 by the point clouds as shown in FIGS. 3, 4 overlayed with frames representing the respective poses POSi and in FIG. 6 by one of the original images as shown in FIG. 1, again overlayed with the frames representing the poses POSi.

In other words, knowing the correspondences between the keypoints $K_{i,j}$ of an object of interest Oi and their correspondences on the synthetic 3D model SYNi of that object of interest Oi which are actually utilized in the training of the network KDN, the pose POSi is determined using, for example, the Umeyama algorithm. Such synthetic models SYNi can be, for example, synthetic 3D CAD models. Knowing 3D keypoints $K_{i,j}$ and their labels Li it becomes possible to establish 3D-3D correspondences between them and the same 3D points on the known synthetic 3D models SYNi and estimate the pose POSi coupling it with the RANSAC procedure.

In short and as a summary of the above, unlike other approaches that use a single RGB image for detection, the proposed pose estimation method PEM uses an entire sequence SEQ of images IMAn, e.g. RGB images. Furtheron, the method PEM utilizes a structure-from-motion approach SfM and performs the sparse reconstruction SR of the scene S. The resulting point cloud reconstruction is then approximated with the edge-like reconstruction by fitting edge segments to the geometric discontinuities in the scene S. The previously trained artificial neural keypoint detection network KDN then detects pre-selected keypoints $K_{i,j}$ for each object Oi. Knowing correspondences between these 3D keypoints $K_{i,j}$ and their correspondences on the synthetic 3D models, the pose is determined using the Umeyama algorithm.

The basis for the above is the previously trained artificial neural keypoint detection network KDN for detection of the 3D keypoints $K_{i,j}$ in the sparse and typically noisy point cloud. However, as mentioned earlier and as descried in detail below, the training of the network KDN is based on purely synthetic data SYNi, e.g synthetic 3D models of potential objects of interest Oi. In the following, synthetic 3D CAD models are used exemplarily as synthetic 3D models SYNi.

Firstly, synthetic data is simpler and cheaper to obtain than real data which is an essential aspect in the area of artificial intelligence which heavily depends on the availability of comprehensive data. Secondly, given a CAD model, it is possible to generate infinitely many images or simulations with it, in contrast to limited sizes of manually labeled real datasets.

The domain gap between the synthetic training data SYNi on the one hand and the real world objects Oi to be processed by the network KDN on the other hand (and between SfM reconstructions and synthetic models, respectively) is bridged by a tailored, exhaustive, domain invariant training data preparation scheme as described below. The domain gap is eventually closed by utilizing the situation that geometric edges are prominent features that can be both extracted from synthetic 3D models as well as from the sparse scene reconstruction SR obtained with the SfM approach and from the edge data EDi, respectively. Moreover, such geometric edges are typically robust to light changes, which can be an issue with the real world representation VR, and therefore promising features to be utilized in the proposed pose estimation method PEM.

Figure 7:
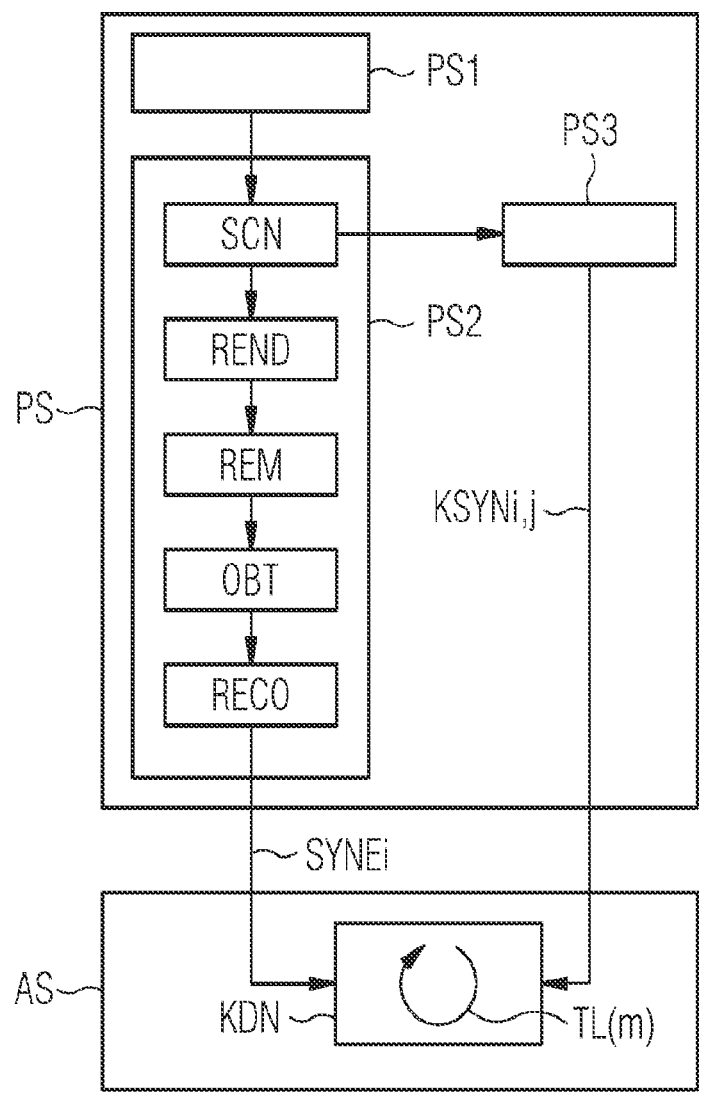
FIG. 7 shows a flow chart for training the network KDN.

However, the process of generation and training, respectively, of the artificial neural keypoint detection network KDN essentially comprises two main steps as shown in FIG. 7, namely a preparation step PS and an adjustment step AS. In more detail, during training of the artificial neural keypoint detection network KDN, which results in the previously trained network KDN, KDN-parameters, e.g. weights etc., which define the behavior of the artificial neural keypoint detection network KDN as a response to an input are adjusted.

The training is based on the creation of one or more synthetic object scenes, wherein for each synthetic object scene the preparation step PS provides training data and the adjustment step AS adjusts the KDN-parameters based on the training data provided in the preparation step PS.

In a first substep PS1 of the preparation step PS, a plurality of known, typically dense synthetic 3D models SYNi, e.g. CAD models, including the models SYNi corresponding to the objects of interest Oi are provided. I.e. the synthetic 3D models SYNi to be used for training at least represent any object of interest Oi to ensure that the pose estimation method PEM can at least estimate the poses of such objects of interest Oi. However, in a practical scenario a comprehensive plurality of synthetic 3D models SYNi is used to train the network KDN, which plurality in the ideal case includes synthetic 3D models for all potential objects of interest, but not only for the limited number of objects of interest in a particular scene to be analysed.

In a second substep PS2 of the preparation step PS a synthetic 3D scene SynS is generated in a step SCN by arranging the provided synthetic 3D models SYNi in a virtual environment, such that poses SynPOSi of the provided synthetic 3D models SYNi are known. The generation of the synthetic 3D scene SynS means that the synthetic 3D models SYNi are spatially arranged in the step SCN in the virtual environment such that their 6D poses SynPOSi with respect to a fixed coordinate system of the virtual environment and with respect to each other are known. Consequently, the edges and vertices of the synthetic 3D models SYNi and the respective keypoints KSYNi,j of the models SYNi are known as well. Thus, the step SCN provides the synthetic 3D scene SynS as well as data SynPOSi, KSYNi,j according to the synthetic 3D models SYNi in the scene.

For the generation of the known synthetic 3D scene SynS by arranging the provided dense synthetic 3D models SYNi in the virtual environment, a virtual surface is generated and subsequently the provided one or more known synthetic 3D models SYNi are randomly arranged and "dropped", respectively, on the virtual surface. With respect to the generation of the virtual surface and the virtual arranging of the synthetic 3D models SYNi on the surface, it might be mentioned that e.g. the "Bullet Physics Simulation" engine which generates scenes by randomly dropping virtual objects on planar surfaces might be applied, i.e. the final position and pose of an object on the support surface is driven by gravity and influenced by other objects already dropped in the scene. Such a dense, synthetic 3D scene SynS with synthetic 3D models SYN1-SYN6 is exemplarily depicted in FIG. 8. For example, these planar structures are sampled from the "ScanNet" dataset according to Dai2017 in order to introduce more variability and make the scenes more realistic. At this stage, the original dense CAD models SYNi are used. All data according to the generated 3D scene SynS are saved, especially including the poses SynPOSi in the scene's SynS coordinate system of all synthetic 3D models SYNi arranged in the scene SynS as well as the corresponding keypoints KSYNi,j.

Thus, a randomly generated synthetic 3D scene SynS is available. However, a simple generation of a further known synthetic 3D scene SynS' is possible via augmentations of an existing, i.e. previously generated synthetic 3D scene SynS. For example, such an existing 3D scene SynS might be augmented by random rotations of the existing 3D scene SynS around a Z-axis, a X-axis, and/or a Y-axis, preferably between [−20°, 20°], by scene flipping, preferably around the Z-axis, by random scaling, preferably by a factor between 0.5 and 2.0 to make the network more robust to scale changes, by introduction of random dropout of points, and/or by addition of Gaussian noise to the points. The Z-axis can be defined to be the axis which is oriented essentially perpendicular to the virtual surface of the 3D scene.

Figure 8:
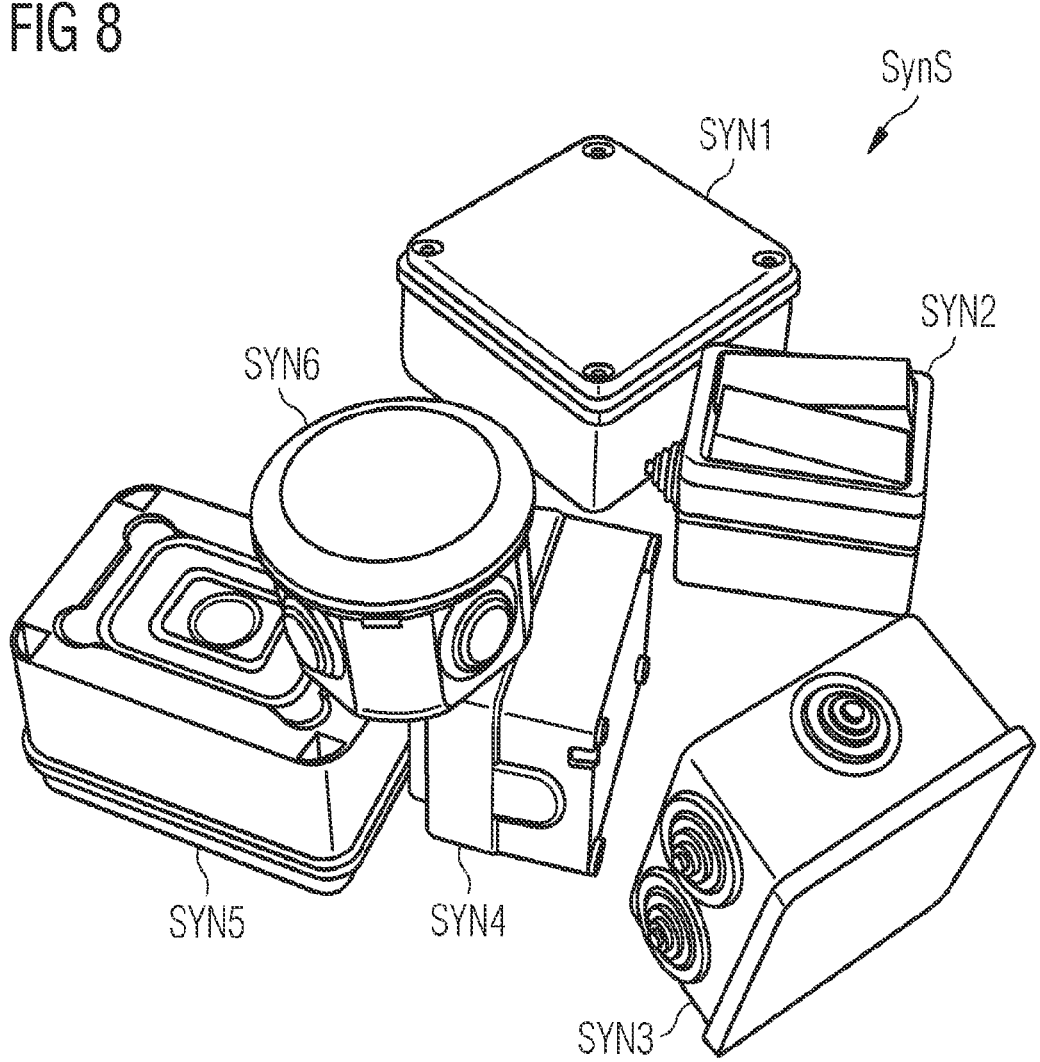
FIG. 8 shows a synthetic scene with synthetic models.

The generated dense synthetic 3D scene SynS as shown in FIG. 8 is, however, not yet ideally suitable for training, as it is not sparse. This issue is addressed in the steps REND, OBT, and RECO as well as an intermediate step REM, by generating a sparse, edge-like representation SynSE of the synthetic 3D scene SynS and, especially, generating the respective edge-like representations SYNEi of the provided dense synthetic 3D models SYNi of the generated synthetic 3D scene SynS. Thus, the edge-like representation SynSE of the synthetic 3D scene SynS is composed of the edge-like representations SYNEi of the synthetic 3D models SYNi of the scene SynS. Thus, eventually each dense synthetic 3D model SYNi is represented in the synthetic 3D scene SynS by a sparse, edge-like representation SYNEi of the respective synthetic 3D model SYNi, therewith composing an edge-like representation SynSE of the scene SynS. The scene SynSE is depicted exemplarily in FIG. 9.

The process of generating the edge-like representations SYNEi, SynSE includes a step REND of rendering the respective generated synthetic 3D scene SynS and the contained synthetic 3D models SYNi, respectively, preferably sampled from a plurality of known views and perspectives, respectively, for example from an upper hemisphere of a virtual sphere around the generated synthetic 3D scene SynS, resulting in a rendered scene SynSR. And rendered synthetic 3D models SYNRi, respectively. For example, each CAD model might be rendered with 1296 poses sampled from the sphere as mentioned above.

Still, the resulting dataset SynSR corresponding to the rendered synthetic 3D models SYNRi is not yet ideally suitable for training as it contains all the points of the respective synthetic 3D models SYNi, even ones which would be invisible from the respective views and perspectives applied in the rendering step REND. Therefore, for each known perspective, features of a respective synthetic 3D model SYNi and SYNRi, respectively, which are not visible in the particular perspective can be removed in a step REM. Such features can be, for example, 3D edges and faces of that model SYNi. This results in a mesh seen from a set of sampled viewpoints with invisible faces and respective vertices removed. Actually, a lookup table can be used to remove such invisible 3D edges, which e.g. correspond to hidden 3D vertices. In this way the scenes SynSE to be used for training are eventually composed of 3D geometric edges defining the objects. However, at this stage the mesh is still dense, as mentioned above.

Figure 9:
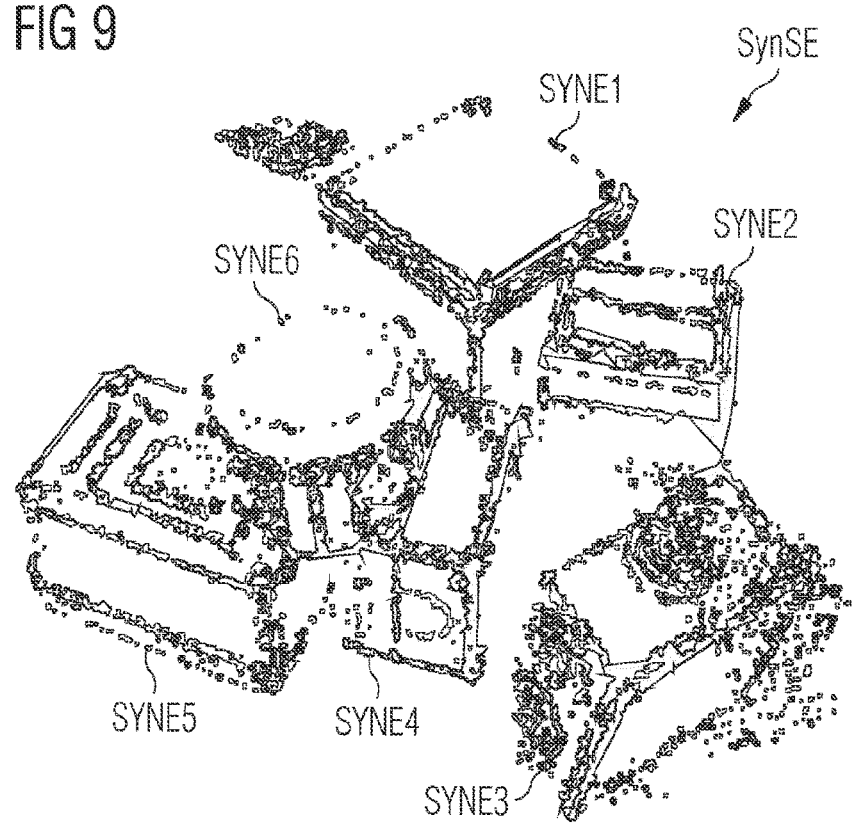
FIG. 9 shows an edge-like representation of the synthetic scene.

The rendered scene SynSR, cleared from invisible edges and vertices as explained above, and the respective rendered synthetic 3D models SYNRi, respectively, are subsequently processed in a step OBT of obtaining a dense point cloud model of the generated synthetic 3D scene and the contained provided synthetic 3D models by applying a perspective-based sampling approach, e.g. according to Birdal2017, to represent the rendered scene as 3D point cloud. Subsequently, a step RECO of reconstructing prominent 3D edges of the dense point cloud model, e.g. according to Hofer2017, to generate the respective sparse, edge-like representation SynSE of the originally generated dense synthetic 3D scene SynS and the respective edge-like representations SYNEi of the provided synthetic 3D models SYNi of the synthetic scene SynS, respectively. A respective sparse scene, corresponding to the dense scene of FIG. 8, is shown in FIG. 9.

For example, in order to obtain the input point clouds for the network KDN, points on the edges of the synthetic models SYNi are randomly sampled online during training. Sampling is done uniformly along an edge of a respective model, wherein a suitable number of samples is determined by $e2/v$, where $e2$ is the length of the respective edge and $v\sim U[3; 10]$. The purpose of the sampling is twofold: On the one hand it prevents the network KDN from overfitting to exact point locations. On the other hand, it enforces the network KDN to learn how to recognize more global geometric structures. The resulting point cloud is either sub-sampled or padded to contain, for example, 16384 points. The latter corresponds to a size which is used for training.

In the end, each of the synthetic 3D scenes SynS has been then rendered from a certain number of virtual camera perspectives and a perspective based sampling algorithm, e.g. according to Birdal2017, has been used to represent rendered scenes SynSR as 3D point clouds. The obtained reconstruction SynSE is essentially a sparse representation of an originally dense model SynS, with geometric features, namely edges, that can be observed from both captured images of the real world object Oi as well as from its synthetic renderings SYNRi and 3D models SYNi, respectively. This bridges the domain gap between the real world object Oi and its synthetic model SYNi. The edges are corresponding to object's geometric edges which are also naturally defining the objects which do not have any texture and can also be extracted from images. Each object Oi and its corresponding synthetic 3D model SYNi for which the 6D pose POSi is to be estimated is represented in this way. Finally, utilizing the edge-like representations to replace the synthetic 3D models in the simulated 3D scenes with the corresponding edge-based models enables that the synthetic and the real world domains have smaller discrepancy.

Thus, in the preparation step PS after the generation of the synthetic 3D scene SynS, a sparse representation of the synthetic 3D scene is computed in the steps REND, REM, OBT, and RECO by using the poses SynPOSi of the synthetic models SYNi in the synthetic scene SynS obtained during the physical simulation in the step SCN and the sparse CAD models SYNEi represented with 3D edges. Just for example, the effect of the perspective-based sampling can be propagated onto the sparse scene as follows: A lookup table is created for each pair of a dense and sparse CAD model. It associates the edges of the sparse model SYNEi with the nearest vertices on the dense model SYNi. Vertices, which were removed during the perspective-based sampling, are subsequently used for removal of the corresponding edges of the models of the sparse scenes. Finally, the sparse scenes are stored as a set of vertices and 3D edges, with a respective class label assigned for each of the vertices. An example of a sparse scene is presented in FIG. 9.

In a third substep PS3 of the preparation step PS, known, pre-selected object keypoints KSYNi,j for each one of the provided synthetic 3D models SYNi in the generated 3D scene are provided. Those keypoints KSYNi,j might have been determined in the SCN step as mentioned above.

The known object keypoints KSYNi,j of a respective synthetic 3D model SYNi to be provided as aspired output of the artificial neural keypoint detection network KDN comprise at least a first keypoint KYSNi,1 and one or more further keypoints KSYNi,k with k=2, 3, . . . for the respective synthetic 3D model SYNi, wherein in the preparation step PS those keypoints KSYNi,j are calculated, for example, such that the first keypoint KSYNi,1 corresponds to the centroid of the respective synthetic 3D model SYNi and the one or more further keypoints KSYNi,k are obtained via a farthest-point-sampling approach, preferably regarding vertices of the respective synthetic 3D model SYNi. The farthest-point-sampling approach assures that each next point that is selected is at the largest distance from the previously selected keypoints.

The poses SynPOSi of the synthetic 3D models SYNi and SYNEi, respectively, in the scene SynS and SynSE, respectively, can be considered to be known. Correspondingly, the respective preselected keypoints KSYNi,j of the known synthetic 3D models SYNEi in the known scene SynSE can also be considered to be known. This enables the training of the neural network KDN where each point on a respective synthetic scene will vote for each of the keypoints of the synthetic 3D model it belongs to. So, for example, the network KDN regresses direction vectors to each of the keypoints KSYNi,j of each 3D model SYNEi. This practically means that the network KDN is able to detect keypoints KSYNi,j and their labels Li, i.e. to which 3D model SYNEi they belong to.

The preparation step PS is completed with completion of the third substep PS3, resulting in the availability of training data corresponding to the generated synthetic 3D scene SynS and the respective keypoints KSYNi,j. Moreover, of course the individual synthetic models SYNi themselves, i.e. the object classes they belong to, are known as well, for example described by the respective labels Li. Thus, for each synthetic model SYNi of the synthetic scene SynS, the pose SynPOSi, the keypoints KSYNi,j, and the label Li can be considered to be known. Subsequently, the KDN-parameters are adjusted in the adjustment step AS based on the training data provided in the preparation step PS.

The adjustment step AS includes one or more training loops TL(m) with m=1, 2, . . . , M to adjust the KDN-parameters. In each training loop TL(m) the edge-like representation SynSE of the generated synthetic 3D scene SynS and known edge-like representations SYNEi of the provided synthetic 3D models SYNi, respectively, are provided as input training data ITD to the artificial neural keypoint detection network KDN and the network KDN is trained utilizing the provided input training data ITD, i.e. the edge-like representations, as well as the provided known object keypoints KSYNi,j, the latter representing an aspired output of the artificial neural keypoint detection network KDN when processing the input training data ITD.

In more detail, the determination and training of the network KDN and of its parameters, respectively, as described above includes the adjustment step AS with the training loops TL(m) during which the KDN-parameters which define the behavior of the network KDN as a response to an input are adjusted. In each loop TL(m), in a first step TL1(m) of the loop TL(m) known input information comprising the result of the preparation step PS, i.e. the generated synthetic 3D scene with the known edge-like representations SYNEi of the provided synthetic 3D models SYNi is provided as input training data ITD to the network KDN.

Based on that input training data the network KDN is trained in a second step TL2(m) of the loop TL(m) utilizing the provided known input information representing the input training data. The network KDN calculates for the provided input training data ITD the keypoints KCALC,I,j of the edge-like representations SYNEi contained in the input training data which are then compared with the provided keypoints KSYNi,j from the preparation step PS to assess the usability of the actual KDN-parameters.

In more detail, in each loop TL(m) of the adjustment step AS the network KDN iteratively processes the provided input training data ITD and adjusts the KDN-parameters to calculate an output and keypoints KCALCi,j, respectively, of the network KDN based on the provided input training data ITD as well as on the actual adjusted KDN-parameters. Such training steps TL(m) are repeated until the keypoints KCALCi,j calculated by the network KDN match best with the provided known keypoints KSYNi,j.

The iterative processing typically includes a plurality of iteration steps TL(m), i.e. M»1. In each iteration step TL(m) the KDN-parameters are adjusted and the network KDN calculates the output KCALCi,j based on the known input training data and the actual adjusted KDN-parameters, i.e. original KDN-parameters in the very first loop TL(1) or KDN-parameters adjusted in the preceding iteration step TL(m−1). The output KCALCi,j is then compared to the keypoints KSYNi,j provided in the preparation step PS. The condition that the iteration is conducted "until" the output KCALCi,j "matches best" with the provided keypoints KSYNi,j means on the one hand that a difference between the output KCALCi,j and the provided keypoints KSYNi,j is below a given threshold, e.g. 2%, and on the other hand that the iterative process is ended when that condition is achieved and the KDN-parameters applied in that last iteration step are assumed to be the adjusted KDN-parameters.

In some embodiments, for each generated synthetic scene SynS, the network KDN is trained simultaneously for all the provided synthetic 3D models SYNi arranged in the respective scene. Thus, the training is executed as a "per-scene" training, i.e. the network KDN is trained simultaneously for all the objects SYNi present in a particular test scene SynS, as opposed to training one network per single object. Training a separate network per each object is commonly done in other object detection and pose estimation pipelines since it tends to improve the results. However, this approach is not scalable and hard to apply in practice. For training, a separate synthetic dataset for each of the scenes is generated. For example, each dataset might contain approximately 15000 training samples.

In some embodiments, the generation of the network KDN starts with the preparation step PS by generating a large number of synthetic 3D scenes, for example using a physics-based simulation. Since geometric edges are features robust to light changes and present in non-textured synthetic CAD models, each CAD model is represented by an edge-like representation, e.g. obtained by a method according to Hofer2017. This representation is then used to replace the synthetic 3D models in the simulated scenes with the corresponding edge-like models. The corresponding method has also been applied to the SfM reconstructions of the real world objects Oi to obtain edge-like scene representations as described above. In this way, the synthetic and real domains show less discrepancy. This allows the artificial neural keypoint detection network KDN to determine object keypoints Ki,j for real world objects of interest Oi, which keypoints Ki,j are then used, e.g. fed to RANSAC and Umeyama methods, to output the poses POSi of the objects of interest Oi.

Figure 10:
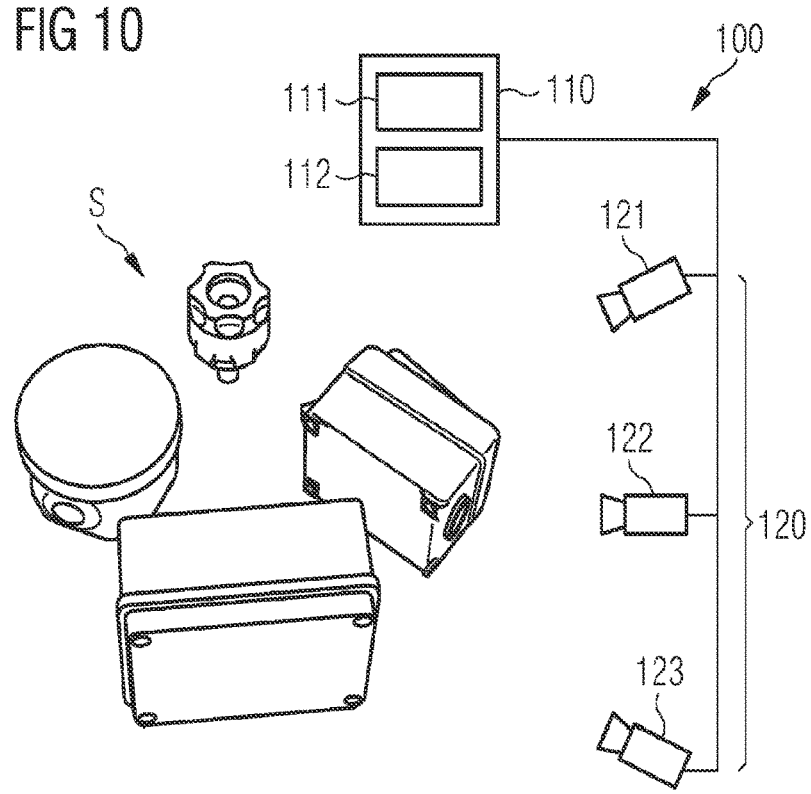
FIG. 10 shows an apparatus for pose estimation.

FIG. 10 shows an example of an apparatus 100 for providing pose information POSi of one or more objects of interest Oi in a scene S, comprising a computer 110, e.g. with a memory 111 and processor 112, configured to execute the described method PEM to estimate the poses POSi of the one or more objects of interest Oi. The processor 112 executes a software which represents the method PEM and the memory 111 can be used to store intermediate results as generally known in the art. The apparatus 100 furthermore comprise a camera system 120 with one or more cameras 121 to generate the sequence SEQ of RGB images IMAn which can be stored, for example, in the memory 111. The camera system 120 can be utilized to image a scene comprising one or more objects of interest Oi to generate the visual representation VR. In case the camera system 120 comprises only one camera 121, such camera can be moved around the scene S and/or the scene S can be moved with respect to the camera 121 such that the variety of perspectives as necessary for the SfM method can be achieved. I.e. the relative positioning of the camera 121 and the scene S is adjustable. As an alternative, a plurality of cameras 121, 122, 123 can be foreseen which might then be fixed with regard to the scene S, but the cameras 121, 122, 123 are positioned such that the image the scene S from different perspectives.

The described method can be implemented in and executed by a processor of a typical computer unit. In some embodiments, such a unit may be realised as any devices, or any means, for computing, in particular for executing a software, an app, or an algorithm. For example, the unit may comprise a central processing unit (CPU) and a memory operatively connected to the CPU. The unit may also comprise an array of CPUs, an array of graphical processing units (GPUs), at least one application-specific integrated circuit (ASIC), at least one field-programmable gate array, or any combination of the foregoing. The unit may comprise at least one module which in turn may comprise software and/or hardware. Some, or even all, modules of the units may be implemented by a cloud computing platform.

While the teachings of the present disclosure has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description. Thus, the scope of the disclosure is not restricted to the above illustrated embodiments but variations can be derived by a person skilled in the art without deviation from the scope thereof.

However, in the following, one possible configuration of the network KDN as well as a detailed description of one possible realization of the PEM approach is presented exemplarily. In general, the network KDN might also be applied for segmentation, detection, and alignment tasks. There are actually two approaches when it comes to deep learning methods in such tasks, namely direct processing of point clouds as unordered sets and handling 3D data represented as a volumetric grid. Each of the approaches has its advantages and disadvantages, e.g. the first is more lightweight, though less noise-resistant, while the second one is more computationally expensive but more robust to noise. For the particular application as addressed herein, it is suggested to opt for the point cloud-based methods, since the data is represented as sparse points and edges between them. This data representation can be converted into the point cloud format by sampling points from the existing edges.

In this example, the network architecture of the artificial neural keypoint detection network KDN is based on the PointNet++ approach according to Qi2017 which has demonstrated good performance in point cloud classification, segmentation, and object localization and which is applicable for the approach of the pose estimation method PEM as well. The backbone of PointNet++ architecture has several set abstraction levels followed by upsampling layers utilizing skip connections, which facilitates learning local features with increasing contextual scales. For a set of points $p(t)$ with $t=1, \ldots, T$ and $p(t) \in R^3$, the backbone module outputs Q seed points s with corresponding features f of dimension D, namely $\{s(q)\}$ with $q=1, \ldots, Q$, where $s(q)=[p(q); f(q)]$ with $p(q) \in R^3$, $f(q) \in R^D$. Then, the seed features $f(q)$ are passed to a voting module composed of a shared Multi Layer Perceptron (MLP) with a ReLU activation function and batch normalization. For each of the seed points s the network KDN outputs class confidences $\{c(q)\}$ with $q=1, \ldots, Q$, where $c(q) \in R^{CL}$ and CL is a number of classes, and estimated keypoint directions $\{D(q)\}$ with $q=1, \ldots, Q$, where $D(q) \in R^{G \times 3}$ is composed of row-wise normalized vectors $d_r$ estimating the directions towards keypoints $K_{i,j} \in R^3$ on an object Oi a seed point $K_{i,j}$ belongs to. The approach is aimed at making a network learn to estimate the relative position of a seed point in a more global context based on the information extracted from the local neighborhoods of different sizes.

A loss function $L = L_{cls} + \lambda \cdot L_{dir}$ is optimized during training. Therein, $L_{cls}$ is a cross-entropy classification loss and $L_{dir}$ is a direction regression loss defined as $$L_{dir} = \Sigma_{q=1}^{Q} \Sigma_{g=1}^{G} \text{smooth}_{L1}(d_{q,g}, \hat{d}_{g,g}) \mathbb{1}\,[s(q) \text{ is on object}] \quad (1)$$

$\hat{d}_{q,g}$ is a ground truth direction vector from a seed point $s(q)$ to a keypoint $K_{i,g}$ of an object Oi and $\lambda$ is a weighting scalar. $\text{smooth}_{L1}$ loss can be defined as in Liu2016. The indicator function "$\mathbb{1}\,[s(q) \text{ is on object}]$" is used to eliminate objects that are on the background.

In practice, the network KDN can, for example, be implemented using the "PyTorch" deep learning framework. For each one of the per-scene synthetic datasets the training can be conducted using the "Adam" optimizer according to Kingma2014 with a learning rate of $1 \cdot 10^{-2}$, a learning rate decay of 0.5, and a decay step of $2 \cdot 10^5$. On average, convergence is observed within 200 epochs of training. The weighting scalar $\lambda$ applied in the loss function L can be set to 5.0, for example.

In the following and based on the above, especially FIG. 2, the application of the method PEM in practice and with more concrete information is provided. A sequence of RGB images is taken in step S1 as initial input for inference. For example, sequentially captured images can be used, although the method PEM is capable of working with unordered sets of images as well. The sequence is then processed in step S2 with the COLMAP SfM method, which jointly estimates camera poses for each of the images and sparse 3D points of the scene seen in the image sequence. For example, a pinhole camera model can be utilized and it can be assumed that the camera's intrinsic parameters are known and do not require further refinement during the SfM reconstruction. The resulting sparse point clouds from COLMAP, however, are still sparse and an even better approximation of the geometric structures of the objects of interest might be needed for the presented pose estimation method. Therefore, as in the case of the training data preparation, the Hofer2017 method is used to get a more detailed reconstruction of the objects' edges in 3D.

However, in practice it needs to be taken into account at the inference time, that reconstruction and camera poses obtained through SfM are typically defined up to a scale, as no ground truth depth information is applied. Input 3D edges are scaled by a scalar SCAL=Mu_train/DIA where Mu_train is the mean diameter of the training samples and DIA is a diameter of the current real world scene. Moreover, Principal Components Analysis (PCA) whitening is applied to the reconstructed scenes to center and axis-align them, which increases their resemblance to the synthetic scenes used during training of the network KDN as described below. Then, the points are sampled on the 3D edges with an average density as used during the training. The resulting point cloud is fed as an input to the trained network KDN in step S3. The network KDN outputs per-seed point classification labels as well as estimations of the keypoint $K_{i,j}$ direction vectors, which are further used for a voting according to the RANSAC approach for object keypoint locations, similarly to PVNet according to Peng2019. For each of the object classes $c \in \{1, \ldots, C\}$ of potential objects of interest Oi and for each object keypoint $K_{i,j}$ a set of H keypoint location proposals is created by randomly sampling tuples of three seed points with the direction vectors. These seed points and directions define lines in 3D and a potential keypoint candidate $K_{hcj}^*$ defined as an intersection of these three lines, which can be defined as an optimization problem which looks for the closest point to all those lines in terms of Euclidean distance, for example:

$$K_{hcj}^* = \operatorname{argmin}_{Khj} \Sigma_{b \in B} \|p_{bj} + \lambda_{bj} d_{bj} - K_{hcj}\|_2^2 \quad (2)$$

B represents an index set of the selected seed points. Solutions to that optimization problem are computed in closed form. Then, all the other seed points belonging to the object of a particular class c vote for the computed keypoint candidates. If the dot product between the estimated vote vector $d_j(p)$ of a seed point and the computed direction vector from a seed point to a candidate $K_{hcj}^*$ is above a given threshold $\theta$, then the seed point is counted as an inlier:

$$\sum_{p \in O_c} \left[ \frac{(K_{hcj}^* - p)}{\|K_{hcj}^* - p\|_2} d_j(p) \geq \theta \right] \quad (3)$$

Finally, all the inlier seed points are used to estimate the keypoints $K_{hcj}^*$ using equation 3.

Having a set of correspondences between the estimated keypoints $$\{K_{hcj}^*\}_{j=1}^{K}$$

and keypoints on the canonical model of an object $$\{K_{hcj}\}_{j=1}^{K}$$

for an object of class c it becomes possible to estimate a similarity transformation ST∈ Sim(3), which transforms and scales from the object's coordinate system to the scene point cloud coordinate system. This transformation can be estimated from the point correspondences in closed form using the Umeyama algorithm. A RANSAC-based scheme is employed to deal with potential outliers. In this step, an estimate of the global scale of the reconstructed sparse scene is also estimated.

However, even a minor error in scale estimation may result in considerable error in camera translation in Z-direction once the poses are reformulated using SE(3) transformations only. Therefore, a need arises for further pose refinement. First, scale-aware point-to-point ICP is used on the reconstructed point cloud. Due to the facts that no real depth data is used and some sparse partial reconstructions of smaller objects are insufficient for ICP, multi-view edge-based refinement on RGB images according to Drummond2002 might be preferable. The camera poses obtained from COLMAP can stay fixed and only the similarity transformation from model to the scene point cloud coordinate system is optimized. Again, no depth information is used. Multi-view consistency enforces the alignment of object contours in every image. This constraint in refinement leads to a better solution, as opposed to refinement in each RGB image separately, which may suffer from projective ambiguity.

What is claimed is:

1. A computer implemented pose estimation method for providing poses of objects of interest in a scene, wherein the scene comprises a visual representation of the objects of interest in an environment, the method comprising:
    conducting for each one of the objects of interest a pose estimation;
    determining edge data of the object of interest from the visual representation representing the edges of the respective object of interest;
    determining keypoints of the respective object of interest by a previously trained artificial neural keypoint detection network, wherein the artificial neural keypoint detection network utilizes the determined edge data of the respective object of interest Oi as input and provides the keypoints of the respective object of interest as output;
    estimating the pose of the respective object of interest based on the respective object's keypoints provided by the artificial neural keypoint detection network.

2. A method according to claim 1, wherein training the previously trained artificial neural keypoint detection network is based on synthetic models which correspond to potential objects of interest.

3. A method according to claim 1, wherein, in case poses are required for more than one object of interest, the pose estimation is conducted simultaneously for all objects of interest.

4. A method according to claim 1, wherein generating the visual representation of the scene includes creating a sequence of images of the scene, representing the one or more objects of interest from different perspectives.

5. A method according to claim 4, wherein a structure-from-motion approach processes the visual representation to provide a sparse reconstruction at least of the one or more objects of interest for the determination of the edge data.

6. A method according to claim 5, wherein, for the determination of the edge data, the provided sparse reconstruction is further approximated with lines wherein the edge data are obtained by sampling points along the lines.

7. A method according to claim 1, wherein:
    training of the artificial neural keypoint detection network, during which KDN-parameters which define the artificial neural keypoint detection network are adjusted, is based on the creation of one or more synthetic scenes;
    for each synthetic scene
    in a preparation step
    one or more known synthetic models of respective one or more potential objects of interest are provided;
    the synthetic scene is generated by arranging the provided synthetic models in a virtual environment, such that poses of the provided synthetic models are known;
    each synthetic model is represented in the synthetic scene by an edge-like representation of the respective synthetic model; and
    known keypoints for each one of the provided synthetic models are provided;
    in an adjustment step one or more training loops to adjust the KDN-parameters are executed;
    wherein in each training loop
    an edge-like representation of the generated synthetic scene comprising the known edge-like representations of the provided synthetic models is provided as input training data to the artificial neural keypoint detection network; and
    the artificial neural keypoint detection network is trained utilizing the provided input training data and the provided known keypoints, representing an aspired output of the artificial neural keypoint detection network when processing the input training data.

8. A Method according to claim 7, wherein for the generation of the known synthetic scene, a virtual surface is generated and the provided one or more known synthetic models are randomly arranged on the virtual surface.

9. A method according to claim 7, wherein the edge-like representations for the corresponding one or more provided synthetic models of the generated synthetic scene are generated by:
    rendering the generated synthetic scene to generate rendered data, preferably rendering each one of the provided synthetic models of the synthetic scene;
    obtaining a dense point cloud model of the generated synthetic scene and by applying a perspective-based sampling approach on the rendered data; and
    reconstructing prominent edges of the dense point cloud model to the respective edge-like generate representation of the generated synthetic scene.

10. A method according to claim 9, wherein for each known perspective, features of a respective synthetic model which are not visible in the particular perspective are removed from the respective edge-like representation.

11. A method according to claim 7, wherein:
    the known object keypoints of a respective synthetic model comprise at least a first keypoint and one or more further keypoints with k=2, 3, . . . for the respective synthetic model;
    the keypoints are calculated such that the first keypoint corresponds to the centroid of the respective synthetic model and the one or more further keypoints are obtained via a farthest-point-sampling approach.

12. A method according to claim 7, wherein for each synthetic scene-Byas, the network is trained simultaneously for all the provided synthetic models arranged in the respective synthetic scene.

13. An apparatus for providing pose information of one or more objects of interest in a scene, an apparatus comprising:
a computer with a memory and a processor;
wherein the memory stores a set of instructions, the set of instructions causing the processor to implement a pose estimation method for providing poses of objects of interest in a scene, wherein the scene comprises a visual representation of the objects of interest oi in environment, the method comprising:
conducting for each one of the objects of interest pose estimation;
determining edge data of the object of interest from the visual representation representing the edges of the respective object of interest;
determining keypoints of the respective object of interest by previously trained artificial neural keypoint detection network, wherein the artificial neural keypoint detection network utilizes the determined edge data of the respective object of interest oi as input and provides the keypoints of the respective object of interest as output;
estimating the pose of the respective object of interest based on the respective object's keypoints provided by the artificial neural keypoint detection network.

14. An apparatus according to claim 13, comprising a camera system for imaging the scene comprising the one or more objects of interest to generate the visual representation.

15. An apparatus according to claim 14, wherein the relative positioning of the camera system and the scene is adjustable.

* * * * *